Sept. 23, 1924.

F. M. SCHNEIDER 1,509,320

DEVICE FOR USE IN LEARNING TO PLAY MUSICAL INSTRUMENTS

Filed June 19, 1922

INVENTOR:
Fred M. Schneider
BY Arthur H. Nelson
ATTY.

Patented Sept. 23, 1924.

1,509,320

UNITED STATES PATENT OFFICE.

FRED M. SCHNEIDER, OF BLUE ISLAND, ILLINOIS.

DEVICE FOR USE IN LEARNING TO PLAY MUSICAL INSTRUMENTS.

Application filed June 19, 1922. Serial No. 569,505.

*To all whom it may concern:*

Be it known that I, FRED M. SCHNEIDER, a citizen of the United States, and a resident of Blue Island, county of Cook, and State of Illinois, have invented certain new and useful Improvements in Devices for Use in Learning to Play Musical Instruments, of which the following is a specification.

My invention relates generally to devices for use in learning to play musical instruments but has more particular reference to devices for use in learning to play the violin, mandolin and mandolin-banjo.

It is an acknowledged fact that it is difficult for the average person quickly to acquire the technique necessary properly to play true musical instruments such as the violin, mandolin and the like, wherein the notes are not mechanically fixed but must be determined and fixed by the player. Heretofore students in learning to play the stringed instruments referred to have been taught in the terms of whole steps and half steps. While this practice is correct, if the student is capable of properly interpreting and applying the meaning of the words "whole steps" and "half steps," and can acquire the skill necessary to make the application, experience teaches that the average student has great difficulty in this respect.

The general object of my invention is to provide means whereby a person may learn more easily to play stringed instruments such as the violin, mandolin, mandolin-banjo and the like.

Another object of my invention is to provide means of such a simple and readily understandable character that by the use thereof any person of ordinary intelligence can quickly acquire the technique necessary to play stringed instruments such as the violin, mandolin and the like.

I aim also to provide means whereby much of the necessary technique can, if desired, be developed without the necessity of using the instrument so that practice may be had where and when an instrument is not available.

My invention consists generally in a device or devices of the form, size and characteristics whereby the above named objects, together with others that will appear hereinafter, are attainable; and my invention will be more readily understood by reference to the accompanying drawings which illustrate what I consider, at the present time, to be the preferred embodiment thereof.

Figure 1:
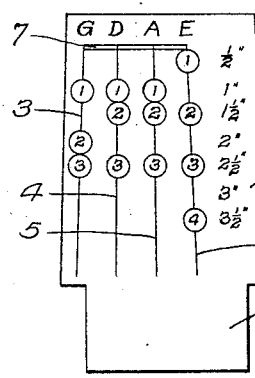
Fig. 1 is a device embodying my invention for use in learning to play the music in the key of C.
Figure 2:
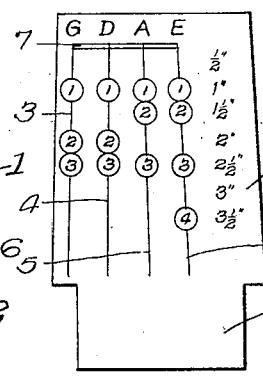
Fig. 2 is a device embodying my invention for use in learning to play music in the key of G.
Figure 3:
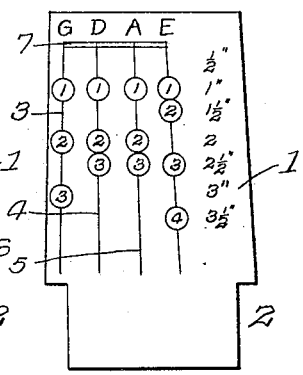
Fig. 3 is a device embodying my invention for use in learning to play music in the key of D.
Figure 4:
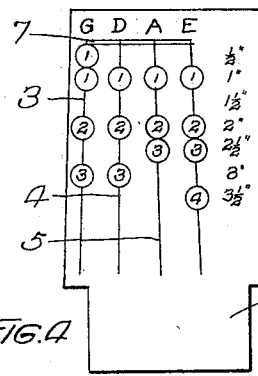
Fig. 4 is a device embodying my invention for use in learning to play music in the key of A.
Figure 5:
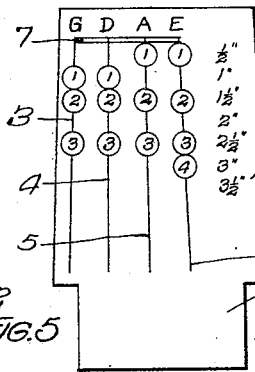
Fig. 5 is a device embodying my invention for use in learning to play music in the key of F.
Figure 6:
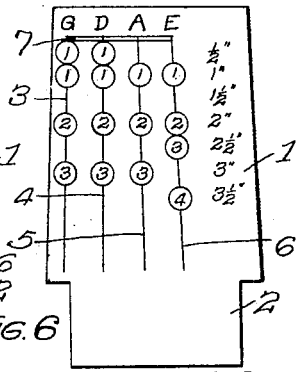
Fig. 6 is a device embodying my invention for use in learning to play music in the key of E.
Figure 7:
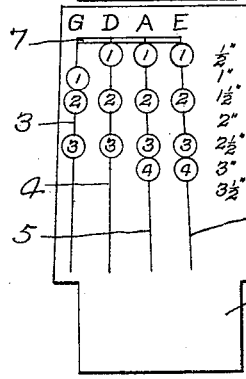
Fig. 7 is a device embodying my invention for use in learning to play music in the key of B flat.
Figure 8:
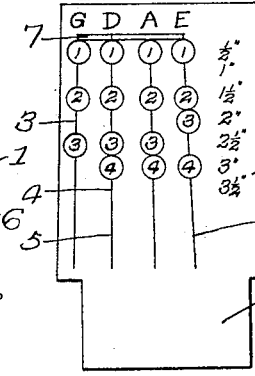
Fig. 8 is a device embodying my invention for use in learning to play music in the key of E flat.
Figure 9:
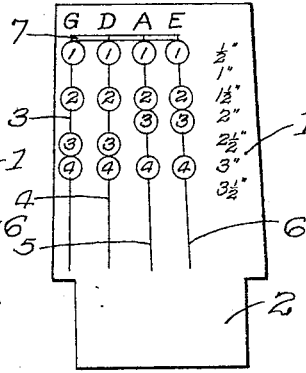
Fig. 9 is a device embodying my invention for use in learning to play music in the key of A flat.

In the drawings I have illustrated means for use in learning to play music in the different keys embodying my invention as embodied in separate devices, but this it should be understood is by way of illustration and not by way of limitation, except where so limited in the claims. Thus I have provided nine devices, each of which is composed of a body portion 1 and a handle portion 2. The portion 1 is preferably substantially the width of the finger key board of the instrument and positioned thereon are means 3, 4, 5 and 6 which represent the four strings of a stringed instrument such as the violin, mandolin, and mandolin-banjo. The means 3, 4, 5 and 6 may be merely inked lines or may be pieces of thread, strings or the like or actual pieces of a musical instrument string which may be secured to the portion 1 in such manner that the position thereof is fixed against displacement. The portion 2 is intended to be a handle portion and the shape, width and length thereof are not important. On the portion 1, I have positioned a plurality of numerals 1, 2, 3 and 4, which for ease of reading are enclosed within circles. These numerals have reference to the first, second, third and fourth fingers. Opposite the numerals will be found designations marked ½", 1", 1½", 2", 2½", 3" and 3½" which, in the present instance correspond with the actual distances that the center of the circles, containing the reference numerals, are from the double line 7 which is intended to indicate the nut of the instrument, being the point from which the measurements are made. The circles, therefore, indicate the proper finger to be used as well as the actual measured distance. The measurement in inches, furthermore, gives the user a proper sense of proportion.

The devices in the other figures of the drawings are similar except that they show the embodiment as necessary for the different keys. A set of these devices may be conveniently carried so that at any time, at any place, where the student so desires, he may practice fingering and acquire quickly and easily considerable skill which will be of great assistance to him in playing the instrument itself. It will be understood that in using the devices they will be used one at a time and will be held in the right hand by grasping the portion 2 so that the left hand may be free to practice the fingering exercises.

The devices embodying my invention do not necessarily need to be embodied in separate sheets or pieces but they may be grouped together. Nor is it necessary that they be of full size, except where they are to be actually used for the fingering exercise. The designation in inches will be sufficient to indicate to the user where the finger is to be placed upon the instrument itself. Thus devices embodying my invention may be used as a part of an instruction book or course. Instead of the student trying to find steps and half steps as has heretofore been necessary he can practice by referring to a device embodying my invention where he will find in inches the position which the various fingers must occupy to produce the desired note.

The many advantages of my invention will be understood by those skilled in this art without further comment.

I claim:—

1. A device for use in learning to play stringed instruments embodying therein means representing the strings of a stringed instrument, numerals positioned adjacent the string representing means and representing the different fingers, and means in line with the numerals indicating the distance said numerals are from a point corresponding to the nut of a stringed instrument.

2. A device for use in learning to play stringed instruments embodying therein means representing the strings of a stringed instrument, numerals positioned adjacent the string representing means and representing the different fingers, and means in line with the numerals indicating the distance in inches said numerals are from a point corresponding to the nut of a stringed instrument.

In testimony whereof, I have hereunto set my hand, this 14th day of June, 1922.

FRED M. SCHNEIDER.